(12) United States Patent
Zhou et al.

(10) Patent No.: US 10,908,268 B2
(45) Date of Patent: Feb. 2, 2021

(54) METHOD FOR IDENTIFICATION OF A NOISE POINT USED FOR LIDAR, AND LIDAR SYSTEM

(71) Applicant: Velodyne LIDAR USA, Inc., San Jose, CA (US)

(72) Inventors: Xiaotong Zhou, Shanghai (CN); Shaoqing Xiang, Shanghai (CN); Zhaoming Zeng, Shanghai (CN); Zhenlei Shao, Shanghai (CN)

(73) Assignee: VELODYNE LIDAR USA, INC., San Jose, CA (US)

( * ) Notice: Subject to any disclaimer, the term of this patent is extended or adjusted under 35 U.S.C. 154(b) by 0 days.

(21) Appl. No.: 16/827,182

(22) Filed: Mar. 23, 2020

(65) Prior Publication Data
US 2020/0379096 A1    Dec. 3, 2020

Related U.S. Application Data

(63) Continuation of application No. PCT/CN2019/085765, filed on May 7, 2019.

(51) Int. Cl.
| | | |
|---|---|---|
| *G01S 7/497* | (2006.01) | |
| *G01S 17/894* | (2020.01) | |
| *G01S 7/487* | (2006.01) | |
| *G01N 21/55* | (2014.01) | |
| *G01S 7/481* | (2006.01) | |

(52) U.S. Cl.
CPC .............. *G01S 7/497* (2013.01); *G01N 21/55* (2013.01); *G01S 7/487* (2013.01); *G01S 7/4815* (2013.01); *G01S 17/894* (2020.01); *G01N 2201/06113* (2013.01)

(58) Field of Classification Search
None
See application file for complete search history.

(56) References Cited

U.S. PATENT DOCUMENTS

| 10,641,606 B2 * | 5/2020 | Ohki | G01S 17/36 |
|---|---|---|---|
| 2015/0109290 A1 * | 4/2015 | Chang | G06T 17/00 |
| | | | 345/420 |
| 2016/0103208 A1 | 4/2016 | Heo et al. | |

(Continued)

FOREIGN PATENT DOCUMENTS

| CN | 105842678 A | 8/2016 |
|---|---|---|
| CN | 106845321 A | 6/2017 |
| CN | 108303690 A | 7/2018 |

(Continued)

OTHER PUBLICATIONS

CN 201910322910.4 First Office Action dated Oct. 8, 2019.

(Continued)

*Primary Examiner* — Isam A Alsomiri
*Assistant Examiner* — Amir J Askarian
(74) *Attorney, Agent, or Firm* — Goodwin Procter LLP

(57) ABSTRACT

The present disclosure relates to a method for identification of a noise point used for a LiDAR, comprising: receiving a point cloud generated by the LiDAR; obtaining at least one of reflectivity and continuity parameter of a point in the point cloud, and a distance between the point and the LiDAR; and determining whether the point is a noise point at least based on at least one of the reflectivity and the continuity parameter, and the distance.

19 Claims, 8 Drawing Sheets

(56) References Cited

U.S. PATENT DOCUMENTS

2019/0372305 A1* 12/2019 Lyu .................. G01S 17/10

FOREIGN PATENT DOCUMENTS

CN          108761461 A    11/2018
EP           1061336 A3    12/2004

OTHER PUBLICATIONS

CN 201910322910.4 Notification on Conducting Related Formalities for Registration dated Jan. 9, 2020.
CN201910322910.4 Notification on Grant of the Patent Right for Invention dated Jan. 9, 2020.
CN201910322910.4 Supplemental Search dated Dec. 30, 2019.
Imaging of LiDAR system based on intensity analysis and target identification.
PCT/CN2019/085765 Written Opinion of the International Searching Authority.
PCT/ISA/210 Search Report CN2019/085765 dated Apr. 22, 2019.

* cited by examiner

METHOD FOR IDENTIFICATION OF A NOISE POINT USED FOR LIDAR, AND LIDAR SYSTEM

CROSS-REFERENCE

This application is a Continuation Application of International Patent Application PCT/CN2019/085765, filed May 7, 2019, which claims the benefit of Chinese Application No. CN201910322910.4, filed on Apr. 22, 2019, each of which is entirely incorporated herein by reference.

TECHNICAL FIELD

The present disclosure relates to the field of LiDAR, and, more specifically, to a method for identification of a noise point used for a LiDAR, and a LiDAR system.

BACKGROUND

LiDAR (light detection and ranging) is a general term for laser active detection sensor devices. The working principle of LiDAR is as follows: a LiDAR emitter emits a beam of laser; the laser beam runs into an object, and returns back to a laser receiver upon diffuse reflection; and a radar module multiplies a time interval between emission and reception of the signal with the velocity of light, and divides by 2 so as to calculate out the distance between the emitter and the object. According to the number of laser beams, it usually includes, for example, single-line LiDAR, 4-line LiDAR, 8-/16-/32-/64-line LiDAR, etc. One or more laser beams are emitted at various angles in the vertical direction, achieving the detection of the three-dimensional profile of a target region through scanning in the horizontal direction. Since a plurality of measuring channels (lines) are equivalent to a plurality of scanning planes of different inclination angles, the more the laser beams in the vertical field of view, the higher the angular resolution in the vertical direction and the greater the density of a laser point cloud.

Taking a mechanical LiDAR as an example, it will generate more noise points and thus affects the quality of a point cloud when used for detection under rainy, snowy or foggy weather. For example, since there will be large and small water drops in a high density in the air under rainy, snowy or foggy weather, when a laser beam is irradiated onto a water drop, it will produce reflection echoes and form corresponding points in a point cloud. As the point of such type is not the one that actually exists in the detected target object, it should be regarded as a noise point.

In addition to the mechanical LiDAR as mentioned above, other types of LiDARs, such as galvanometer scanning LiDAR, rotating mirror scanning LiDAR, or pure solid-state LiDAR including Flash LiDAR and phased array LiDAR, will also encounter the same noise point problem when used for detection in rain, snow and fog.

The contents in the Background just disclose the known technologies of inventors rather than surely represent the prior art in the field.

SUMMARY

In view of at least one of the defects existing in the prior art, the present disclosure provides a method for identification of a noise point used for a LiDAR, comprising:

step S201: receiving a point cloud generated by the LiDAR;

step S202: obtaining a distance between a point in the point cloud and the LiDAR, and at least one of reflectivity and continuity parameter of the point; and step S203: determining whether the point is a noise point at least based on the distance and the at least one of the reflectivity and the continuity parameter.

According to one aspect of the present disclosure, the step S202 comprises: obtaining the reflectivity of the point in the point cloud and the distance between the point and the LiDAR, wherein the step S203 comprises determining whether the point is a noise point based on the reflectivity and the distance.

According to one aspect of the present disclosure, the step S202 comprises: obtaining the continuity parameter of the point in the point cloud and the distance between the point and the LiDAR, wherein the step S203 comprises: determining whether the point is a noise point based on the continuity parameter and the distance.

According to one aspect of the present disclosure, the step S203 comprises: determining that the point is a noise point when the distance is within a predefined range of distance and the reflectivity is less than or equal to a predefined threshold for reflectivity.

According to one aspect of the present disclosure, the step S203 comprises: calculating a noise point confidence level of the point, and determining that the point is a noise point when the noise point confidence level is beyond a normal range of confidence level, wherein calculating the noise point confidence level of the point comprises: a distance factor is set to zero when the distance is within the predefined range of distance, otherwise the distance factor is set as a first weight; a reflectivity factor is set to zero when the reflectivity is less than or equal to a predefined threshold for reflectivity, otherwise the reflectivity factor is set as a second weight; and the noise point confidence level equals to the sum of the distance factor and the reflectivity factor, wherein the first weight is greater than the second weight.

According to one aspect of the present disclosure, the step S202 comprises: obtaining the reflectivity and the continuity parameter of the point and the distance between the point and the LiDAR; wherein the step S203 comprises: determining whether the point is a noise point based on the distance, the reflectivity and the continuity parameter.

According to one aspect of the present disclosure, the method further comprises: obtaining noise of the point and the number of echo pulses of the point; wherein the step S203 comprises: determining whether the point is a noise point based on the distance, the reflectivity, the continuity parameter, the noise and the number of echo pulses.

According to one aspect of the present disclosure, the step of determining whether the point is a noise point comprises: calculating a noise point confidence level of the point, and determining that the point is a noise point when the noise point confidence level is beyond a normal range of confidence level, wherein calculating the noise point confidence level of the point comprises: a distance factor is set to zero when the distance is within a predefined range of distance, otherwise the distance factor is set as a first weight; a reflectivity factor is set to zero when the reflectivity is less than or equal to a predefined threshold for reflectivity, otherwise the reflectivity factor is set as a second weight; a continuity factor is set to zero when the continuity parameter is beyond the normal range of continuity parameter, otherwise the continuity factor is set as a third weight; a noise factor is set to zero when the noise is greater than a threshold for noise, otherwise the noise factor is set as a fourth weight; an echo pulse number factor is set to zero when the number of echo pulses is greater than a threshold for pulse number, otherwise the echo pulse number factor is set as a fifth weight, and the noise point confidence level equals to the sum of the distance factor, the reflectivity factor, the continuity factor, the noise factor and the echo pulse number factor.

According to one aspect of the present disclosure, the first, second, third, fourth and fifth weights satisfy one or more of the following conditions: the first weight equals to the sum of the second and third weights; the second weight equals to the third weight; the first weight equals to the threshold for confidence level; the sum of the fourth and fifth weights equals to the second and/or third weights; and the first weight is greater than the second, third, fourth and fifth weight.

According to one aspect of the present disclosure, the method further comprises: dynamically adjusting the first, second, third, fourth and fifth weights based on the detected state of weather.

According to one aspect of the present disclosure, the step of dynamically adjusting comprises: reducing the second weight and increasing the fourth weight when snowy weather is detected; and/or increasing the fifth weight when foggy weather is detected.

According to one aspect of the present disclosure, the step S203 comprises: determining that the point is a noise point when the distance is within a predefined range of distance, and the continuity parameter is beyond a normal range of continuity parameter.

According to one aspect of the present disclosure, the step of determining whether the point is a noise point comprises: calculating a noise point confidence level of the point, and determining that the point is a noise point when the noise point confidence level is beyond a normal range of confidence level, wherein calculating the noise point confidence level of the point comprises: a distance factor is set to zero when the distance is within a predefined range of distance, otherwise the distance factor is set as a first weight; a continuity factor is set to zero when the continuity parameter is beyond the normal range of continuity parameter, otherwise the continuity factor is set as a third weight; and the noise point confidence level equals to the sum of the distance factor and the continuity factor, wherein the first weight is greater than the third weight.

The present disclosure further discloses a LiDAR system, comprising:

a LiDAR configured to scan its surroundings to generate a point cloud;

a denoising unit coupled to the LiDAR to receive the point cloud, and configured to perform the method for identification of a noise point described above to determine whether a point in the point cloud is a noise point, and filter out noise points in the point cloud; and an output unit coupled to the denoising unit, and configured to output the point cloud.

According to one aspect of the present disclosure, the LiDAR system further comprises a control unit coupled to the LiDAR, the denoising unit and the output unit, and capable of enabling or disabling the denoising unit, wherein in an enabled state, the denoising unit filters out noise points in the point cloud, and the output unit outputs the point cloud with the noise points filtered out; and in a disabled mode, the denoising unit is disabled, and the output unit outputs the point cloud with the noise points not being filtered out.

According to one aspect of the present disclosure, the control unit enables the denoising unit when rainy, snowy or foggy weather is detected.

According to one aspect of the present disclosure, the control unit determines that rainy, snowy or foggy weather is detected, when the number of noise points goes beyond a predefined threshold.

According to one aspect of the present disclosure, the LiDAR system further comprising an input unit for receiving input from a user, wherein the control unit is capable of enabling or disabling the denoising unit based on the input from the user.

The present disclosure further discloses a LiDAR system, comprising:

a LiDAR configured to scan its surroundings to generate a point cloud;

a confidence level calculating unit coupled to the LiDAR to receive the point cloud, and configured to calculate a noise point confidence level of a point in the point cloud at least based on a distance between the point and the LiDAR, and at least one of reflectivity and continuity parameter of the point; and an output unit coupled to the LiDAR and the confidence level calculating unit, and configured to output the point cloud and noise point confidence levels of points in the point cloud.

According to one aspect of the present disclosure, the confidence level calculating unit is configured to calculate a noise point confidence level of a point in the point cloud, based on a distance between the point and the LiDAR, reflectivity of the point, continuity parameter of the point, noise of the point and a pulse number factor of the point, wherein calculating the noise point confidence level of the point comprises: a distance factor is set to zero when the distance is within the predefined range of distance, otherwise the distance factor is set as a first weight; a reflectivity factor is set to zero when the reflectivity is less than or equal to a predefined threshold for reflectivity, otherwise the reflectivity factor is set as a second weight; a continuity factor is set to zero when the continuity parameter is beyond a normal range of continuity parameter, otherwise the continuity factor is set as a third weight; a noise factor is set to zero when the noise is greater than a threshold for noise, otherwise the noise factor is set as a fourth weight; a pulse number factor is set to zero when the number of pulses is greater than a threshold for pulse number, otherwise the pulse number factor is set as a fifth weight; and the noise point confidence level equals to the sum of the distance factor, the reflectivity factor, the continuity factor, the noise factor and the pulse number factor, wherein the first weight is greater than the second, third, fourth and fifth weight.

According to one aspect of the present disclosure, the LiDAR system further comprises an input unit for receiving input from a user, wherein the input unit is capable of instructing, based on the input from the user, the output unit about whether to filter out noise points in the point cloud.

The present disclosure further discloses a device for identification of a noise point used for a LiDAR, comprising:

a receiving unit configured to receive a point cloud generated by the LiDAR;

an obtaining unit configured to obtain a distance between a point in the point cloud and the LiDAR, and at least one of reflectivity and continuity parameter of the point; and a determining unit configured to determine whether the point is a noise point at least based on to the distance and the at least one of the reflectivity and the continuity parameter.

The present disclosure further discloses a computer readable storage medium having stored thereon computer executable instructions that, when executed by a processor, perform the method for identification of a noise point described above.

BRIEF DESCRIPTION OF THE DRAWINGS

The accompanying drawings, as part of the present disclosure, are provided for the purpose of further understanding of the present disclosure, and the schematic embodiments and description serve to illustrate the present disclosure, both of which should not impose any improper limitation on the present disclosure. In the drawings.

DETAILED DESCRIPTION

Figure 1:
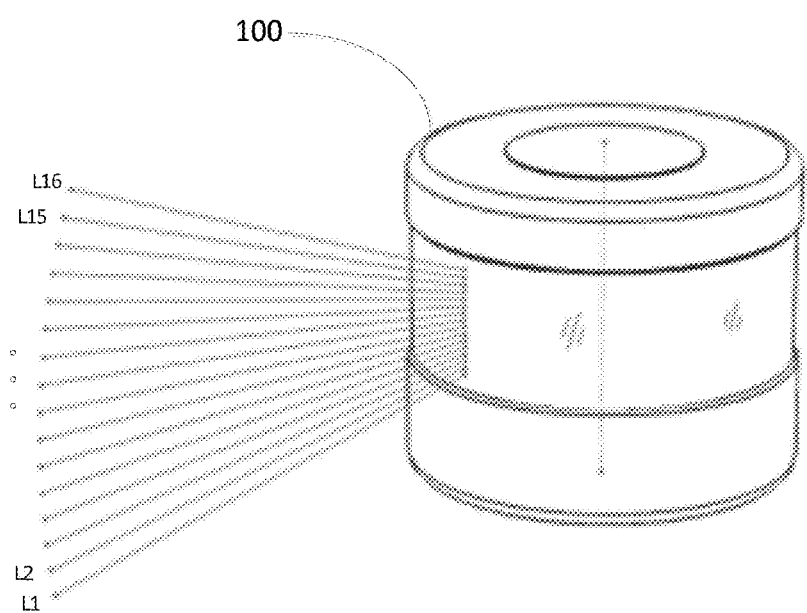
FIG. 1 is a schematic illustrating a LiDAR.

The following exemplary embodiments will be described only in a brief manner. Just as those skilled in the art will recognize, changes in various ways to the examples described herein can be carried out without departing from the spirit or scope of the present disclosure. Therefore, the drawings and description are deemed substantively exemplary, instead of limitative.

In the description of the present disclosure, it need be understood that the orientation or position relations denoted by such terms as "central" "longitudinal" "latitudinal" "length" "width" "thickness" "above" "below" "front" "rear" "left" "right" "vertical" "horizontal" "top" "bottom" "inside" "outside" "clockwise" "counterclockwise" and the like are based on the orientation or position as shown in the accompanying drawings, and only used for the purpose of facilitating description for the present disclosure and simplification of the description, instead of indicating or suggesting that the denoted devices or elements must be specifically oriented, or configured or operated in some specific orientation. Thus, such terms should not be construed to limit the present disclosure. In addition, such terms as "first" and "second" are only used for the purpose of description, rather than indicating or suggesting relative importance or implicitly indicating the number of the designated technical features. Accordingly, features defined with "first" or "second" may, expressly or implicitly, include one or more of such features. In the description of the present disclosure, "more" means two or above, unless otherwise defined explicitly and specifically.

In the description of the present disclosure, it need to be specified that, unless otherwise specified and defined explicitly, such terms as "mount" "link" and "connect" should be understood as generic terms. For example, connection may refer to fixed connection, dismountable connection, or integrated connection; also to mechanical connection, electric connection or intercommunication; further to direct connection, or connection by an intermediary medium; or even to internal communication between two elements or interaction between two elements. For those skilled in the art, they can construe the specific meaning of such terms herein in light of specific circumstances.

Herein, unless otherwise specified and defined explicitly, if a first feature is "above" or "below" a second one, it may cover the direction contact between the first and second features, also cover the contact via another feature therebetween, instead of the direct contact. Furthermore, if a first feature "above", "over" or "on the top of" a second one, it may cover that the first feature is right above or on the inclined top of the second feature, or just indicate that the first feature has a horizontal height higher than that of the second feature. If a first feature is "below", "under" or "on the bottom of" a second feature, it may cover that the first feature is right below and on the inclined bottom of the second feature, or just indicates that the first feature has a horizontal height lower than that of the second feature.

The disclosure below provides many different embodiments and examples for achieving different structures described herein. In order to simplify the disclosure herein, the following will give the description of the parts and arrangements embodied in specific examples. Surely, they are just for the exemplary purpose, not intended to limit the present disclosure. Besides, the present disclosure may repeat a reference number and/or reference letter in different examples, and such repeat is for the purpose of simplification and clarity, and itself denotes none of the relations among various embodiments and/or arrangements as discussed. In addition, the present disclosure provides examples for a variety of specific techniques and materials, but the common skilled persons in the art are aware of an application of other techniques and/or a use of other materials.

The following description, along with the accompanying drawings, sets forth the preferable examples herein. It should be understood that the preferable examples described herein are only for the purpose of illustrating and explaining, instead of limiting, the present disclosure.

With regard to data of echoes of radar point cloud for under rainy, snowy or foggy weather, the inventors of the present disclosure discover that a noise point in the LiDAR point cloud could be effectively identified by means of a combination of the distance, reflectivity, point continuity parameter and other features of a point in the point cloud. Those skilled in the art may understand, although a LiDAR point cloud under rainy, snowy or foggy weather is taken as an example for illustration herein, the protection scope of the present disclosure should not be limited to identification of noise points under rainy, snowy or foggy weather, but cover applications for identifying and determining noise points under other states of weather.

FIG. 1 illustrates an instance of a LiDAR 100. The LiDAR is a 16-line LiDAR, which means it may emit 16 lines of laser beams in total, including L1, L2, . . . , L15 and L16, in an vertical plane as shown in the figure (each line of laser beams just corresponds to one channel of all the 16 channels of the LiDAR) for detection of the surroundings. During the detection, the LiDAR 100 may rotate about its vertical axis. During the rotation, each channel of the LiDAR successively emits a laser beam in turn according to a certain time interval (e.g., 1 µs) and carries out detection so as to complete a line scanning in the vertical field of view; and then perform the next line scanning in the vertical field of view as spaced with a certain angle (e.g., 0.1 or 0.2 degree) in the direction of the horizontal field of view, so as to form a point cloud upon multiple times of detection during the rotation and thus be able to detect the surroundings.

Figure 2:
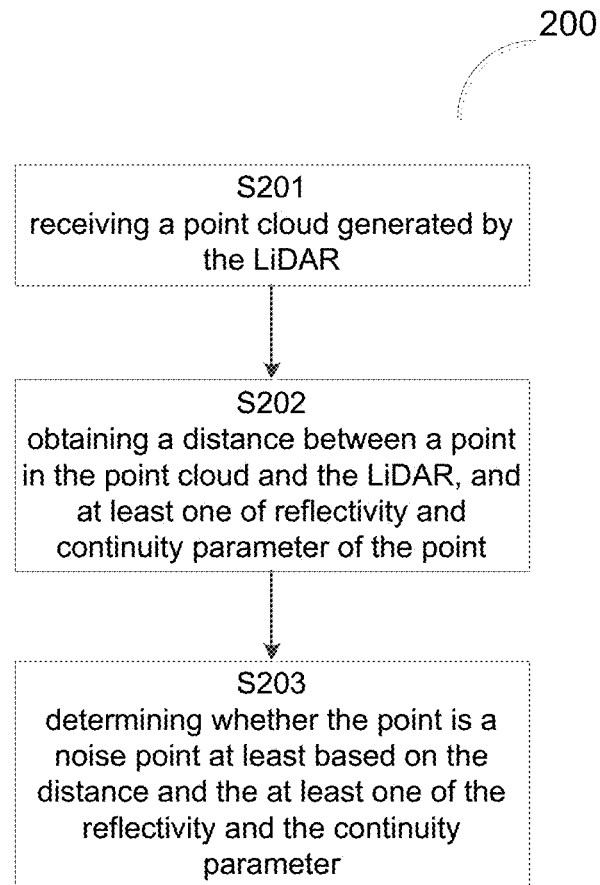
FIG. 2 illustrates a method for identification of noise point used for a LiDAR in accordance with the first aspect of the present disclosure.

FIG. 2 illustrates a method for identification of noise point of a LiDAR in accordance with the first aspect of the present disclosure. As shown in FIG. 2, the method for identification of noise point comprises:

At Step S201, receiving a point cloud generated by the LiDAR.

Data of the point cloud generated by the LiDAR may usually include coordinates of every point and reflectivity of the point (the reflectivity is proportional to the strength of the reflected beam and the distance between the target point and the LiDAR). In the coordinates of a point, the mounting position of an LiDAR, for example, is taken as an origin, and the offset of the point may be specifically represented by polar coordinates (i.e., distance and angle), or represented using x/y/z three-dimensional rectangular coordinates.

At Step S202, obtaining a distance between a point in the point cloud and the LiDAR, and at least one of reflectivity and continuity parameter of the point.

Figure 3:
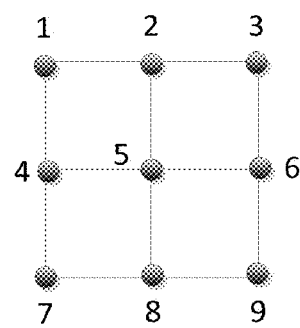
FIG. 3 schematically illustrates the projection of multiple points in a point cloud of a LiDAR onto a plane perpendicular to the laser direction.

The distance between the point and the LiDAR may be calculated out directly by the coordinates of the point. The reflectivity of the point may be obtained directly from the data of the point cloud. Herein, the "continuity parameter" of the point may be defined as a characterization parameter that indicates the continuity between the point and one or more points of its adjacent points in the point cloud, such as the distance to one or more of the surrounding points in the point cloud. With reference to FIG. 3, the continuity parameter of the present disclosure will be described. FIG. 3 schematically illustrates the projection of a point cloud generated by a LiDAR on a plane perpendicular to the laser direction (for simplicity, the depth information is not shown in FIG. 3). Among others, point 5, for example, is a point currently to be determined, and is an echo detected out at the time $t_n$ by the laser beam L2 in FIG. 1, point 4 is an echo detected out at the last time $t_{n-1}$ by the same channel, namely by the laser beam L2, and point 6 is an echo detected out at the next time $t_{n+1}$ by the same channel, namely by the laser beam L2. Correspondingly, point 1, point 2 and point 3 are echoes detected out at the time $t_{n-1}$, $t_n$, and $t_{n+1}$ by the laser beam L3, respectively; and point 7, point 8 and point 9 are echoes detected out at the time $t_{n-1}$, $t_n$, and $t_{n+1}$ by the laser beam L1, respectively. It should be noted that although FIG. 3 shows the equal spacing between the points, this drawing is just exemplary, not meaning equidistant spacing between echo points formed at successive time $t_{n-1}$, $t_n$, and $t_{n+1}$) by the adjacent beams in the point cloud data. In the present disclosure, the continuity parameter of point 5 may either refer to the absolute value of the difference value between the distance from point 5 to the LiDAR, and the distance from any one of the eight points (that are above, below, to the left, to the right, to the upper left, to the upper right, to the lower left and to the lower right of point 5) to the LiDAR, or refer to the weighted average of the difference values between the distance from point 5 to the LiDAR and the distance from multiple points of the eight points (that are above, below, to the left, to the right, to the upper left, to the upper right, to the lower left and to the lower right of point 5) to the LiDAR. Both of these are within the scope of the present disclosure. Under the inspiration of the conception herein, those skilled in the art may make specific adaptation according to needs.

When a normal object is detected by a LiDAR, those generated points usually show a relatively good continuity. Good continuity of points herein means the lower absolute value of the difference value between the distances from adjacent points to the LiDAR, for example, within the error of range detection of the LiDAR. One of the main application scenarios of LiDAR is for detecting a variety of objects in road traffic, while the speed of a moving object in road traffic is quite lower than the velocity of light. LiDAR has a higher resolution in horizontal angles, e.g., 0.1 or 0.2 degree. Thus, mostly, especially when an object is closer to a LiDAR, for example, within a range of 5-10 meters in which noise points are relatively concentrated or prominent under rainy, snowy or foggy weather, the points scanned at horizontal angles of two consecutive scanning correspond to the same object (except for just at the edge of the object). Furthermore, LiDAR has a very high scanning frequency. For example, the time interval between performing line scanning in the same vertical field of view by two adjacent channels of the LiDAR is about 1 µs, and the cycle for one line scanning in the vertical field of view is also just more than ten µs or tens of µs, so the moving distance of a moving object in road traffic may be ignored during such a short time period. Therefore, the distances from adjacent points of a LiDAR point cloud to the LiDAR should be equal theoretically, and the difference value between the distances actually measured should be relatively tiny. When there is a great distance difference, it is very likely caused by noise points. For example, when the difference value (or the weighted average of multiple difference values) between the distance from a certain point to the LiDAR and the distance from any one or more of the eight points (that are above, below, to the left, to the right, to the upper left, to the upper right, to the lower left and to the lower right of the certain point) to the LiDAR is greater than a threshold (such as 1 meter), it may be determined that the point has a poor continuity, and thus the point may be a noise point. In addition to the use of the difference value (or the minimum difference, maximum difference, or mean difference) between the distance from a point to the LiDAR and the distance from adjacent points to the LiDAR as the continuity parameter, the correlation between a test point and its surrounding points may be also calculated to be used as the continuity parameter, which is similar to a median filter, that is, an eigenvalue can be calculated out according to convolution and may be used to characterize a discreteness degree between a current point and its surrounding points; when the discreteness degree is higher than a certain threshold, it should be deemed that the point and the surrounding ones are discontinuous.

Moreover, the threshold for the continuity parameter is also variable. For example, the continuity parameter may be adjusted according to the distance between a test point and the LiDAR, and if the distance increases, the measuring error for the LiDAR will also become greater correspondingly, and the threshold for the continuity parameter may be set at a greater value.

In addition, in accordance with another example described herein, the difference value between the respective distances from two points to the LiDAR can be calculated approximately as the distance between these two points.

This is because of the very small angular spacing between two points in the horizontal direction, e.g., 0.1 or 0.2 degree, in the process of scanning by the LiDAR. Thus, in this case, the distance between points 4 and 5 approximately equals to the difference value between the distance of point 4 to the LiDAR and the distance of point 5 to the LiDAR.

In Step S203: determining whether the point is a noise point at least based on at least one of the reflectivity and the continuity parameter, and the distance.

In the following it will specifically describe the method for determination of the noise point herein according to the distance and at least one of the reflectivity and the continuity parameter.

In accordance with one example described herein, a noise point may be identified and determined by means of distance together with reflectivity. The inventors discover that noise points usually concentrate within a range of 5-10 meters away from the LiDAR, or more prominently within a range of 5-7 meters. Meanwhile, the reflectivity of a noise point is usually less than or equal to 2%. Thus, a noise point may be identified according to a combination of distance and reflectivity. For example, when the distance is within the predefined range of distance (such as 5-10 meters, or 5-7 meters), and the reflectivity is less than or equal to a predefined threshold for reflectivity (such as 2%), the point is determined to be a noise point.

In accordance with one example described herein, a noise point may be identified and determined by means of distance together with continuity parameter. For example, when the distance is within the predefined range of distance (such as 5-10 meters, or 5-7 meters), and the continuity parameter is beyond the normal range of continuity (for example, the continuity parameter is defined as the difference values between the distance from the point to the LiDAR and the distances from the surrounding points to the LiDAR, and the normal continuity ranges are, for example, less than or equal to 1 meter, or less than or equal to 0.5 meter), the point is determined to be a noise point. As stated above, continuity parameter is, for example, the difference values between the distance from the current point to the LiDAR and the distances from a previous point (a left point in FIG. 3) and/or a next point (a right point in FIG. 3) by the same channel to the LiDAR, or the difference value between the distance from the current point to the LiDAR and the distances from the points by the adjacent channels above and below (upper and/or lower points in FIG. 3) to the LiDAR, or the distances from the current point to other adjacent points in the point cloud, or the parameters characterizing the discreteness degree of the current point relative to the surrounding points. If the continuity parameter is beyond the normal range of continuity, it indicates that the point is very likely to be a noise point, rather than a point truly positioned on the surrounding object.

In accordance with one example described herein, a noise point may be identified and determined by means of a combination of distance, reflectivity and continuity. For example, when the distance is within the predefined range of distance (such as 5-10 meters, or 5-7 meters), the reflectivity is less than or equal to a predefined threshold for reflectivity (such as 2%), and the continuity parameter is beyond the normal range of continuity parameter (such as 1 meter), the point is determined to be a noise point.

Figure 4A:
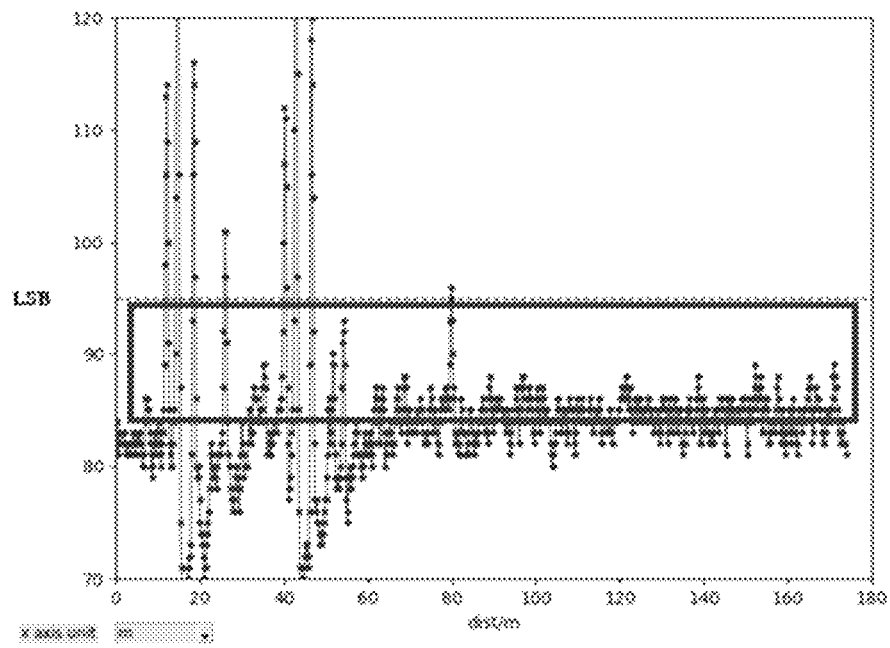
FIG. 4A illustrates a method for calculating the noise of echoes in accordance with one example of the present disclosure.

Moreover, the inventors of the present application discover that the noise of the echo corresponding to a point to be determined is also another factor that may be used for determining a noise point, especially in the case of snow. In a LiDAR, the laser beams emitted by the emitter of the LiDAR run into an object, and form echoes upon diffuse reflection, which are then received by the laser receiver to generate analog data signals (i.e., echo waveform signals); the analog data signals are sampled by the ADC at a certain frequency, and quantization-coded, thereby obtaining a series of sampling points, as shown in FIG. 4A. Waveform noises may be characterized using RMS, i.e., characterizing the fluctuation degree of the waveform, and the specific calculation may be conducted by obtaining the sum of the square of the difference values between each sampling point and echo base line and then calculating the square root of the sum. The echo base line herein refers to a mean value of signals generated by the laser receiver without laser beam reflection, which may be construed as a background noise signal value.

In addition, the operation of calculating RMS is relatively complicated, the computing resource of FPGA is also so limited that it is rather difficult to use FPGA to perform such a calculation, and a waveform may further contain normal echo signals besides noise, thereby making it difficult to have statistics. Therefore, other numerical values which may be calculated more easily may also be used for characterizing the noise of the waveform. For example, in accordance with one preferable example described herein, as shown in FIG. 4A, the echo base line is 85 LSB (Least Significant Bit) value of ADC; and within the range of 10 LSB value above the echo base line, counting 200 sampling points (a number based on experience, which may be likewise 100 or 300 surely) from left to right, the magnitude of the noise of the waveform may be characterized by using the sum or average value of the difference value between the ordinate value of each sampling point and the echo base line, or using the area of a graph surrounded by a curve formed by connecting 200 sampling points, a straight line through the abscissa of the first sampling point and parallel to the Y-axis, a straight line through the abscissa of the 200th sampling point and parallel to the Y-axis, and the echo base. It need be specified that the LSB value is the unit to characterize the magnitude of the signal after ADC sampling in the circuit, and is relevant to the performance of the adopted ADC. In addition, the 10 LSB value above the echo base line as selected in the preferable example has relation to an echo signal detection threshold as predefined for the LiDAR, in which the echo signal detection threshold is used by the system to determine that a signal is a valid echo signal when the signal has the signal strength greater than or equal to the echo signal detection threshold, and to determine that the signal is noise when it has the signal strength less than the echo signal detection threshold. Those skilled in the art also may select other suitable values according to their mastered prior technologies and knowledge in the field. Of course, in practical implementation, those skilled in the art may also adopt other units besides LSB value to characterize the strength and magnitude of echo signals; and using LSB value as the unit of echo to describe the strength of echo signals herein is just to allow those skilled in the art to better understand and implement the present invention, and it imposes no limits to the protection scope of the present invention.

Figure 4B:
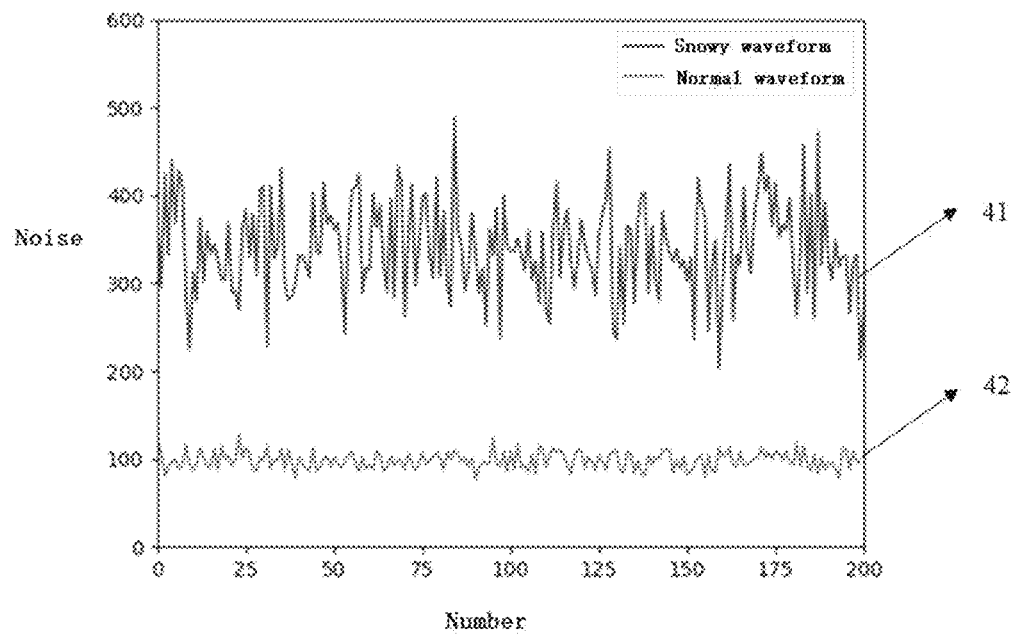
FIG. 4B illustrates a comparison between the waveform noise in the case of snow and the normal waveform noise in accordance with one example of the present disclosure.

In accordance with one example described herein, the method is used to calculate the noise of the echo of a normal point under snowy weather and the noise of the echo of a noise point caused by the snowy weather. As shown in FIG. 4B, the echo noise of each noise point caused by the snowy weather is above 200 (unitless), while the noise of the waveform of a normal point is about 100 only. They may be easily distinguished from each other. Moreover, lines 41 and 42 in FIG. 4B, though presented as continuous lines, are both actually the lines constituted by connecting discrete points one by one. The abscissa stands for the number of measured points, and the abscissa 200 in the figure represents 200 times of detection (200 points) conducted for the same one scenario, thereby obtaining 200 results of noise detection correspondingly, for example, obtaining 200 waveforms of the echo signals similar to that in FIG. 4A. Subsequently, for example, for the abscissa of 1, the ordinate of the points in line 42 represents that the noise of the echo of a normal point is 99, and the ordinate of the points in line 41 represents that the noise of the echo of the noise points caused by the snowy weather is 302. And for example, for the abscissa of 25, which represents the 25th test, the ordinate of the points in line 42 represents that the noise of the echo of a normal point is 102, while the ordinate of the points in line 41 represents that the noise of the echo of the noise points caused by the snowy weather is 298.

In accordance with one example described herein, a noise point may be identified and determined by means of a combination of distance, reflectivity, continuity and noise. For example, when the distance is within the predefined range of distance (such as 5-10 meters, or 5-7 meters), the reflectivity is less than or equal to a predefined threshold for reflectivity (such as 2%), the continuity parameter is beyond the normal range of continuity parameter (such as 1 meter), and the noise of the point is greater than a noise threshold (such as 200), the point is determined to be a noise point.

Moreover, the inventors of the present application discover that the number of echo pulses is also another factor available for determining a noise point. A laser beam containing one laser pulse is emitted to an object, and reflected back, forming an echo beam which is detected by a LiDAR. Theoretically, the number of echo pulses being detected should be one only. However, during practical detection, the number of echo pulses that may be detected as greater than the measuring threshold is often more than one for some reasons. For example, a laser beam will gradually diffuse as it travels forward, so that it may run into two different objects successively. The inventors find that the number of echo pulse may increase under rainy, snowy or foggy weather. Therefore, during detection of a certain point, when the number of the detected echo pulses is more than a pulse number threshold (e.g., 3), it may indicate that the point may be a noise point. In addition, to reduce crosstalk between two different LiDARs, the laser beams emitted by LiDARs are usually pulse-encoded. For example, a detecting laser beam includes two laser pulses, the time interval of which is encoded, i.e., dual-pulse laser detection. Therefore, during the dual-pulse laser detection, the pulse number threshold may be set at 7. For example, when the number of the detected echo pulse is more than a pulse number threshold (e.g., 7), it indicates that the point may be a noise point.

In accordance with one example described herein, a noise point may be identified and determined by means of a combination of distance, reflectivity, continuity and the number of echo pulses. For example, when the distance is within the predefined range of distance (such as 5-10 meters, or 5-7 meters), the reflectivity is less than or equal to a predefined threshold for reflectivity (such as 2%), the continuity parameter is beyond the normal range of continuity parameter (such as 1 meter), and the number of echo pulses is more than a pulse number threshold (such as 7), the point is determined to be a noise point.

In accordance with one example described herein, a noise point may be identified and determined by means of a combination of distance, reflectivity, continuity, noise and the number of echo pulses. For example, when the distance is within the predefined range of distance (such as 5-10 meters, or 5-7 meters), the reflectivity is less than or equal to a predefined threshold for reflectivity (such as 2%), the continuity parameter is beyond the normal range of continuity parameter (such as 1 meter), the noise of the point is greater than a noise threshold (such as 200), and the number of echo pulses is more than a pulse number threshold (such as 7), the point is determined to be a noise point.

In accordance with one example described herein, a noise point may be identified and determined by means of a combination of continuity and reflectivity. For example, when the continuity parameter is beyond the normal range of continuity parameter (such as 1 meter), and the reflectivity is less than or equal to a predefined threshold for reflectivity (such as 2%), the point is determined to be a noise point.

In accordance with one example described herein, a noise point may be identified and determined by means of a combination of continuity, reflectivity and noise. For example, when the continuity parameter is beyond the normal range of continuity parameter (such as 1 meter), the reflectivity is less than or equal to a predefined threshold for reflectivity (such as 2%), and the noise of the point is greater than a noise threshold (such as 200), the point is determined to be a noise point.

In accordance with one example described herein, a noise point may be identified and determined by means of a combination of continuity, reflectivity and the number of echo pulses. For example, when the continuity parameter is beyond the normal range of continuity parameter (such as 1 meter), the reflectivity is less than or equal to a predefined threshold for reflectivity (such as 2%), and the number of echo pulses is more than a pulse number threshold (such as 7), the point is determined to be a noise point.

In accordance with one example described herein, a noise point may be identified and determined by means of a combination of continuity, reflectivity, noise and the number of echo pulses. For example, when the continuity parameter is beyond the normal range of continuity parameter (such as 1 meter), the reflectivity is less than or equal to a predefined threshold for reflectivity (such as 2%), the noise of the point is greater than a noise threshold (such as 200), and the number of echo pulses is more than a pulse number threshold (such as 7), the point is determined to be a noise point.

In accordance with one example described herein, noise may be used to determine whether a state of weather is snowy. For example, when the noise of the point is greater than a noise threshold (such as 200), it is determined that the state of weather is snowy, or the noise point is a noise point caused by the snowy state of weather. Since the echo noise becomes larger under snowy weather, and as shown in FIG. 4B, the echo noise of almost every point under snowy weather is above 200, this factor, i.e. echo noise, may be substantially used to determine a noise point under the snowy weather.

In accordance with one example described herein, a combination of noise and distance may be used to determine whether a state of weather is snowy. For example, when the noise of the point is greater than a noise threshold (such as 200), and the distance is within the predefined range of distance (such as 5-10 meters, or 5-7 meters), it is determined that the state of weather is snowy, or the point is a noise point caused by the snowy state of weather.

In accordance with one example described herein, a combination of noise and continuity may be used to determine whether a state of weather is snowy. For example, when the noise of the point is greater than a noise threshold (such as 200), and the continuity parameter is beyond the normal range of continuity parameter (such as 1 meter), it is determined that the state of weather is snowy, or the point is a noise point caused by the snowy state of weather.

In accordance with one example described herein, a combination of noise, distance and continuity may be used to determine whether a state of weather is snowy. For example, when the noise of the point is greater than a noise threshold (such as 200), the distance is within the predefined range of distance (such as 5-10 meters, or 5-7 meters), and the continuity parameter is beyond the normal range of continuity parameter (such as 1 meter), it is determined that the state of weather is snowy, or the point is a noise point caused by the snowy state of weather.

In accordance with one example described herein, a combination of noise, distance and the number of echo pulses may be used to determine whether a state of weather is snowy. When the noise of the point is greater than a noise threshold (such as 200), the distance is within the predefined range of distance (such as 5-10 meters, or 5-7 meters), and the number of echo pulses is more than a pulse number threshold (such as 7), it is determined that the state of weather is snowy, or the point is a noise point caused by the snowy state of weather.

In accordance with one example described herein, a combination of noise, distance, continuity and the number of echo pulses may be used to determine whether a state of weather is snowy. When the noise of the point is greater than a noise threshold (such as 200), the distance is within the predefined range of distance (such as 5-10 meters, or 5-7 meters), the continuity parameter is beyond the normal range of continuity parameter (such as 1 meter), and the number of echo pulses is more than a pulse number threshold (such as 7), it is determined that the state of weather is snowy, or the point is a noise point caused by the snowy state of weather.

In accordance with one example described herein, a combination of the number of echo pulses and distance can be used to determine whether a state of weather is rainy or foggy. When the number of echo pulses is more than a pulse number threshold (such as 7), and the distance is within the predefined range of distance (such as 5-10 meters, or 5-7 meters), it is determined that the state of weather is rainy or foggy, or the point is a noise point caused by the rainy or foggy state of weather. As enumerated in the foregoing various examples, parameters including distance, reflectivity, continuity, noise and pulse number, or various combinations thereof, can be used to determine a noise point and a specific state of weather. In accordance with one example described herein, by means of calculating the noise point confidence level of a point, the point may be likewise determined to be a noise point when the noise point confidence level is beyond the normal range of confidence level.

With regard to the foregoing examples of various combinations, a corresponding noise point confidence level may be calculated, and the calculation method thereof will be provided as below only for the purpose of illustration.

With regard to the example involving identification and determination of a noise point by using a combination of distance and reflectivity, the calculation method as shown in Table 1, for example, may be adopted.

TABLE 1

| Characteristic Parameter | Determination Condition | Weight |
|---|---|---|
| Distance | Distance between 5 and 10 meters | 10 |
| Reflectivity | Reflectivity less than or equal to 2% | 5 |

For example, with regard to each of the characteristic parameters in the Table 1 above, if the determination condition for the characteristic parameter is satisfied, the contribution coefficient or factor of the confidence level brought by the characteristic parameter is 0, otherwise the contribution coefficient or factor of the confidence level brought by the characteristic parameter is a weight of the characteristic parameter. Finally, if the final confidence level is determined to be beyond the normal range of confidence level, a noise point is determined. For example, if a certain point m has a distance of 12 m to the LiDAR, then the determination condition of distance is not satisfied, and the distance factor will be 10; and if the reflectivity is 3%, thereby not satisfying the determination condition of the reflectivity, then the reflectivity factor is set as 5. The noise point confidence level equals to the sum of the distance factor and reflectivity factor, namely, 10+5=15. The normal range of confidence level may be set according to experience and/or specific weather or environment conditions. In accordance with one example, the normal range of confidence level is greater than or equal to 10. When a confidence level is greater than or equal to 10, it indicates the point is a normal point; and when a confidence level is beyond the range, namely, less than 10, it indicates the point is a noise point. In accordance with one example described herein, the weight of distance (a first weight) is greater than that of reflectivity (a second weight), as shown in Table 1.

It need be specified that the weight for each of the characteristic parameters above and the normal range of confidence level set at 10 are just examples of the present disclosure, and the weight for each characteristic parameters and the normal range of confidence level may be changed as needed. The endpoints of the normal range of confidence level may be referred to as confidence level threshold, for example, 10.

Table 2 shows a calculation method to identify and determine a noise point according to a combination of distance, reflectivity and continuity, by means of calculation of noise point confidence level.

TABLE 2

| Characteristic Parameter | Determination Condition | Weight |
|---|---|---|
| Distance | Distance between 5 and 10 meters | 10 |
| Reflectivity | Reflectivity less than or equal to 2% | 5 |
| Continuity | Continuity parameter exceeding 1 meter | 5 |

Among others, calculation of a noise point confidence level of a point is as follows: a distance factor is set to zero when the distance is within the range of the predefined distance, otherwise the distance factor is set as a first weight (i.e. the weight of distance); a reflectivity factor is set to zero when the reflectivity is less than or equal to the predefined threshold for reflectivity, otherwise the reflectivity factor is set as a second weight (i.e. the weight of reflectivity); and a continuity factor is set to zero when the continuity parameter is beyond the normal range of continuity parameter, otherwise the continuity factor is set as a third weight (i.e. the weight of continuity). The noise point confidence level equals to the sum of the distance factor, the reflectivity factor and the continuity factor.

Table 3 shows a calculation method to identify and determine a noise point according to a combination of distance, reflectivity, continuity, noise and the number of echo pulses, by means of calculation of a noise point confidence level.

TABLE 3

| Characteristic Parameter | Determination Condition | Weight |
| --- | --- | --- |
| Distance | Distance between 5 and 10 meters | 10 |
| Reflectivity | Reflectivity less than or equal to 2% | 5 |
| Continuity | Continuity parameter exceeding 1 meter | 5 |
| Noise | Waveform base noise greater than 200 | 3 |
| Pulse Number | Pulse number greater than 7 | 3 |

Among others, calculation of a noise point confidence level of a point is as follow: a distance factor is set to zero when the distance is within the range of the predefined distance, otherwise the distance factor is set as a first weight (i.e. the weight of distance); a reflectivity factor is set to zero when the reflectivity is less than or equal to the predefined threshold for reflectivity, otherwise the reflectivity factor is set as a second weight (i.e. the weight of reflectivity); a continuity factor is set to zero when the continuity parameter is beyond the normal range of continuity parameter, otherwise the continuity factor is set as a third weight (i.e. the weight of continuity); a noise factor is set to zero when the noise is greater than the threshold for noise, otherwise the noise factor is set as a fourth weight (i.e., the weight of noise); and an echo pulse number factor is set to zero when the number of echo pulses is greater than the threshold for pulse number, otherwise the echo pulse number factor is set as a fifth weight (i.e. the weight of the number of echo pulses). The noise point confidence level equals to the sum of the distance factor, the reflectivity factor, the continuity factor, the noise factor and the echo pulse number factor.

In accordance with one preferable example disclosed herein, the first, second, third, fourth and fifth weights satisfy one or more of the following conditions:

The first weight equals to the sum of the second and third weights;

The second weight equals to the third weight;

The first weight equals to the threshold for confidence level;

The sum of the fourth and fifth weights equals to the second and/or third weight; and The first weight is greater than the second, third, fourth or fifth weight.

In accordance with one preferable example described herein, the first, second, third, fourth and fifth weights may be dynamically adjusted according to the detected state of weather, including adjusting the absolute value of each weight and the relative proportional relation therebetween.

For example, a noise point caused by the snowy weather has greater echo noise, and almost every noise point caused by the snowy weather in the point cloud has an echo noise greater than 200. Moreover, the reflectivity of a noise point caused by the snowy weather has a greater value, so it may be difficult to determine a noise point caused by the snowy weather according to the reflectivity. Therefore, correspondingly, the weight of reflectivity should be reduced under the snowy weather. Thus, when snow is detected, the second weight (the weight of reflectivity) may be dynamically lowered while the fourth weight (the weight of echo noise) may be increased.

Moreover, when fog is detected, the fifth weight may be increased.

After use of the method for identification of noise point (by means of continuity+reflectivity) as described herein for denoising a LiDAR point cloud in FPGA, it may be found from the result that the method may filter out noise points under the rainy weather very effectively. The proportion of normal points that are lost due to the filtering operation is at 1/144, completely within an acceptable range.

The thresholds, weights and the proportional relations between weights of various parameters in the examples illustrated above are just determined by the inventors based on experience and a large number of experiments, are illustrated as preferable examples of the present disclosure, and should not serve to limit the protection scope of the present disclosure.

Second Aspect

Figure 5:
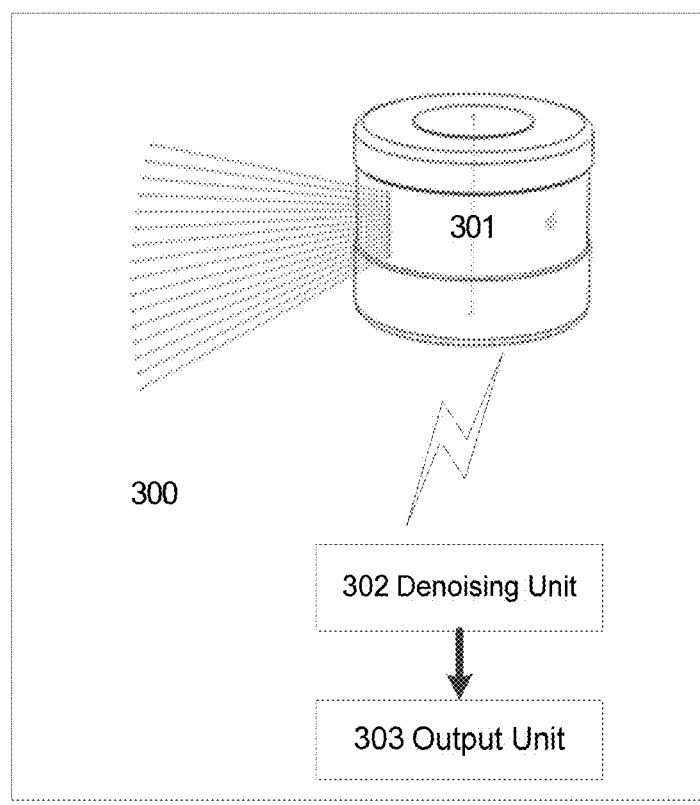
FIG. 5 schematically illustrates a LiDAR system in accordance with the second aspect of the present disclosure.

The second aspect of the present disclosure involves a LiDAR system 300. With reference to FIG. 5, the detailed description will be made as below.

As shown in FIG. 5, the LiDAR system 300 comprises: a LiDAR 301, a denoising unit 302, and an output unit 303. Among others, the LiDAR 301, for example, may be an existing LiDAR, as the LiDAR 100 as shown in FIG. 1, and is configured to scan surroundings to generate point cloud data, while its specific structure will not be described in detail here. The denoising unit 302 is coupled to the LiDAR 301 to receive the point cloud, and configured to perform the method 200 for identifying a noise point as described in the first aspect of the present disclosure to determine whether a point in the point cloud is a noise point, and configured to filter out noise points in the point cloud. The output unit 303 is coupled to the denoising unit 302, and outputs the point cloud. As shown, the information flow from the denoising unit 302 to the output unit 303 is unidirectional, but the present disclosure is not limited to this because a bidirectional information flow between them is also possible.

As shown in FIG. 5, the LiDAR 301, the denoising unit 302 and the output unit 303 are three separate units. But this is just for the exemplary purpose. Both the denoising unit 302 and the output unit 303 may be integrated into the LiDAR 301. For example, a denoising unit 302 may be added to the current LiDAR 301, to receive point cloud data, and determine and filter out noise points according to the method 200 for identification of noise point, and then by using the output unit 303, i.e., an output interface, the point cloud with noise points filtered out is output and presented to a user. Of course, the LiDAR 301, the denoising unit 302 and the output unit 303 also may be separate units. For example, the LiDAR 301 is only responsible for laser detection of the surroundings, and output of original point cloud data. The denoising unit 302 and the output unit 303, for example, may be a computer, workstation, or application specific integrated circuit (ASIC) responsible for data processing, which, after receiving the point cloud data, conduct such operations as identification and filtering for noise points, and output. These should all fall within the protection scope hereof.

Figure 6:
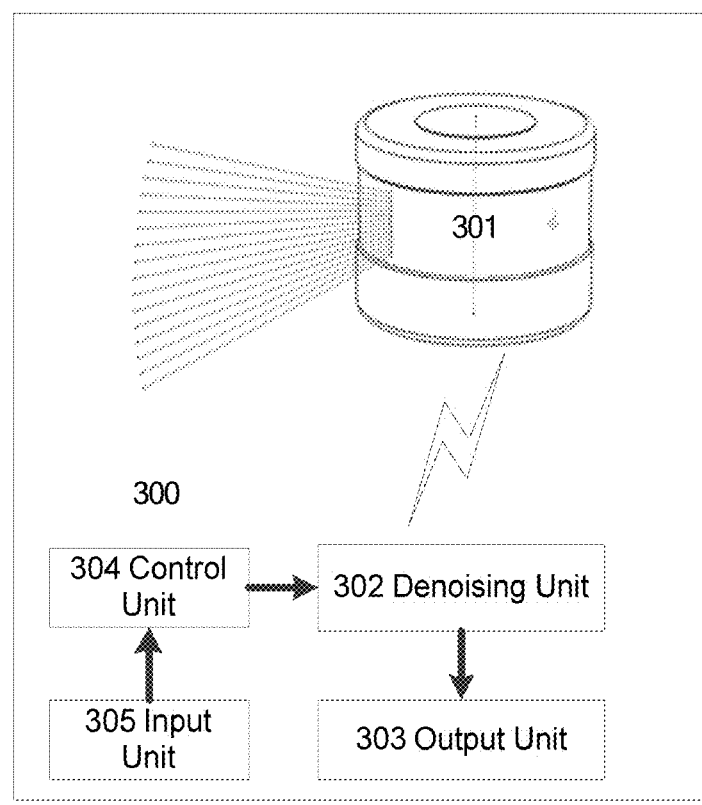
FIG. 6 illustrates a LiDAR system in accordance with one preferable example of the present disclosure.

FIG. 6 illustrates one preferable example described herein. Among others, the LiDAR system 300 further comprises a control unit 304. The control unit 304 is coupled to the denoising unit 302, and may enable or disable the denoising unit 302. In an enabled state, the denoising unit 302 filters out noise points in the point cloud, and the output unit 303 outputs the point cloud with noise points filtered out; and in a disabled mode, the denoising unit 302 is disabled, and the output unit 303 outputs the point cloud without noise points filtered out. Preferably, the control unit 304 is coupled to the LiDAR 301 and the output unit 303.

In accordance with one preferable example described herein, the denoising unit 302 is enabled by default.

In accordance with one preferable example described herein, the denoising unit 302 is disabled by default, and turns enabled under certain circumstances. For example, when rainy, snowy or foggy weather is detected, the control unit 304 enables the denoising unit 302. This is because, in a state of rainy, snowy or foggy weather, a great amount of water in liquid or solid state exists in the air, which my easily produces some abnormal radar echoes to cause a great number of noise points in the point cloud.

In accordance with one preferable example described herein, for example, when the number of noise points exceeds a predefined threshold, the control unit 304 determines that rainy, snowy or foggy weather is detected. For example, a counter may be provided in the control unit 304 or the denoising unit 302 and count the number of the noise points in a point cloud detected currently; when the count value goes beyond a predefined threshold, it may determine that the current state of weather is rainy, snowy or foggy, thereby triggering or enabling the denoising unit 302.

Preferably, the LiDAR system 300 may further comprise a precipitation sensor, such as an optical sensor or a capacitive sensor. When a state of rainy, snowy or foggy weather is detected, an output signal of the precipitation sensor may be used to trigger to enable the denoising unit 302. An optical sensor, for example, comprises a luminous diode and a transparent window. When no precipitation occurs, almost all light beams emitted by the luminous diode will be reflected onto a photosensitive element. When precipitation occurs, for example, in a state of rainy, snowy or foggy weather, water drops or moisture will appear on the transparent window, part of light beams emitted by the luminous diode will be deflected, and the total amount of light received by the photosensitive element is caused to change, thereby a state of rainy, snowy or foggy weather may be determined and detected, and further triggering to enable the denoising unit 302.

In accordance with one preferable example described herein, part of parameters as previously mentioned may be also used to determine rainy, snowy or foggy weather, so as to trigger enabling of the denoising unit 302. For example, when the reflectivity of a point in the point cloud is higher than a certain threshold, snowy weather may be determined, thereby triggering and enabling the denoising unit 302 then. Additionally, when the number of echo pulses of a point in the point cloud goes beyond a certain threshold, foggy weather may be determined, thereby triggering and enabling the denoising unit 302 then.

As shown in FIG. 6, in accordance with one preferable example described herein, the LiDAR system 300 further comprises an input unit 305 for receiving input from a user. Among others, the control unit 304 may enable or disable the denoising unit 302 according to the input from the user. This has the advantage that the user may decide whether to enable the denoising unit 302 and whether to perform a noise filtering operation.

Figure 7:
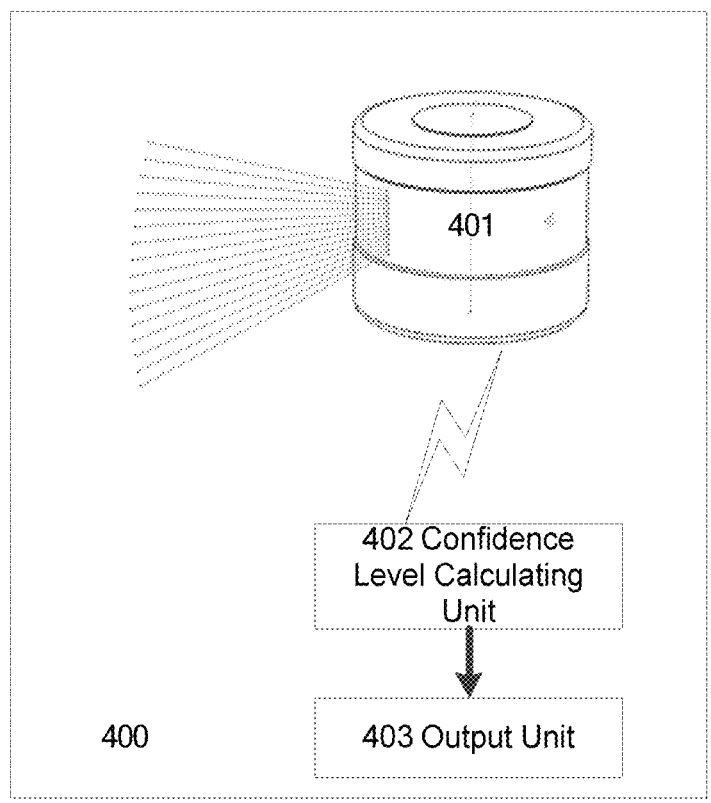
FIG. 7 illustrates a LiDAR system in accordance with another example of the present disclosure.

FIG. 7 illustrates a LiDAR system 400 in accordance with another example described herein. As shown in FIG. 7, the LiDAR system 400 comprises: a LiDAR 401, a confidence level calculating unit 402, and an output unit 403. The LiDAR 401 is configured to scan surroundings to generate point cloud, while its specific structure will not be described in detail here. The confidence level calculating unit 402 is coupled to the LiDAR 401 to receive the point cloud, and is configured to calculate a noise point confidence level of a point of the point cloud at least according to a distance between the point and the LiDAR and at least one of reflectivity and continuity parameter of the point. The output unit 403 is coupled to the LiDAR 401 and the confidence level calculating unit 402, and outputs the point cloud and a noise point confidence level of the point in the point cloud.

The calculation method of the noise point confidence level is similar to the description as made in the first aspect of the present disclosure, that is, use of one of the five characteristic parameters or any combination of the five characteristic parameters (including distance, reflectivity, continuity, noise and the number of echo pulses) to perform calculation. Here, one example will be provided only, and the rest will not go into details. For example, according to a distance from a point in the point cloud to the LiDAR, reflectivity of the point, continuity parameter of the point, noise of the point and pulse number factor of the point, a noise point confidence level of the point is calculated. The specific calculation comprises: for example, a distance factor is set to zero when the distance is within the predefined range of distance, otherwise the distance factor is set as a first weight; a reflectivity factor is set to zero when the reflectivity is less than or equal to a predefined threshold for reflectivity, otherwise the reflectivity factor is set as a second weight; a continuity factor is set to zero when the continuity parameter is beyond the normal range of continuity parameter, otherwise the continuity factor is set as a third weight; a noise factor is set to zero when the noise is greater than a noise threshold, otherwise the noise factor is set as a fourth weight; and a pulse number factor is set to zero when the pulse number is greater than a threshold for pulse number, otherwise the pulse number factor is set as a fifth weight; and the noise point confidence level equals to the sum of the distance factor, the reflectivity factor, the continuity factor, the noise factor and the pulse number factor.

Preferably, the first weight is greater than the second, third, fourth, and fifth weights.

Similar to the LiDAR system 300 as shown in FIGS. 5 and 6, in the LiDAR system 400 in FIG. 7, the confidence level calculating unit 402 and the output unit 403 may be integrated into the LiDAR 401, or the three may be implemented as separate units. These should both fall within the protection scope hereof.

By the technical solution of the example, while the point cloud is output, the noise confidence level of a point in the point cloud may be also provided to a user. In a specific embodiment, one or more bits may be additionally added to the point cloud data of the LiDAR, in which the confidence level information is written in; the confidence level information is provided to a user for reference; and the user may decide whether to optimize radar point cloud graph or filter out noise points according to the confidence level information.

Figure 8:
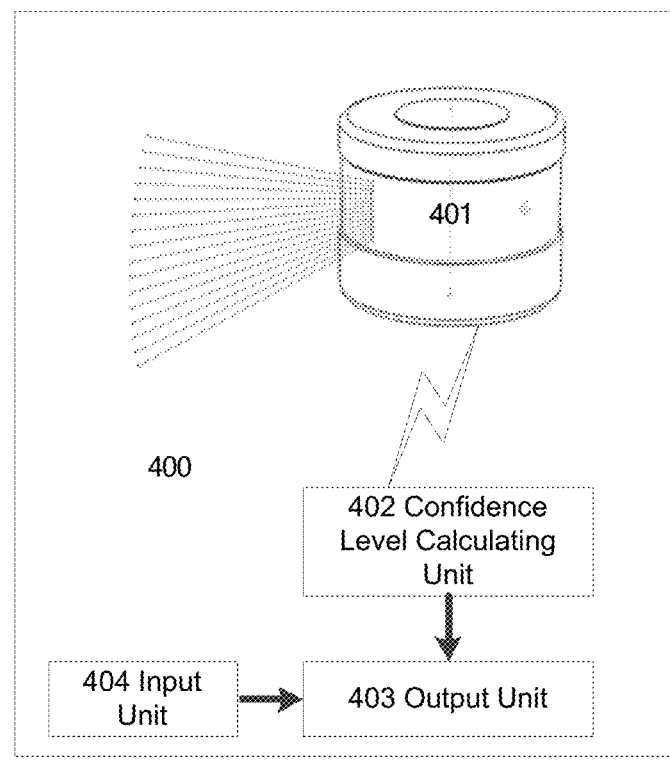
FIG. 8 illustrates a LiDAR system in accordance with another example of the present disclosure.

As shown in FIG. 8, in accordance with one preferable example described herein, the LiDAR system 400 further comprises an input unit 404 for receiving input from a user, wherein the input unit 404 may instruct, according to the input of the user, the output unit about whether to filter out noise points in the point cloud. For example, when a user thinks there are too many noise points in the output point cloud (for example, in the case of rain, snow or fog) that it is necessary to filter them out, the user may use the input unit 404 to instruct the output unit 403 to filter out noise points, and then output the point cloud. After receiving the instruction of filtering noise points, the output unit 403 determines, according to the noise point confidence level of a point in the point cloud, that the point is a noise point and filter it out when the noise point confidence level is beyond the normal range of confidence level. Therefore, the output point cloud excludes noise points, or includes them as less as possible.

Third Aspect

Figure 9:
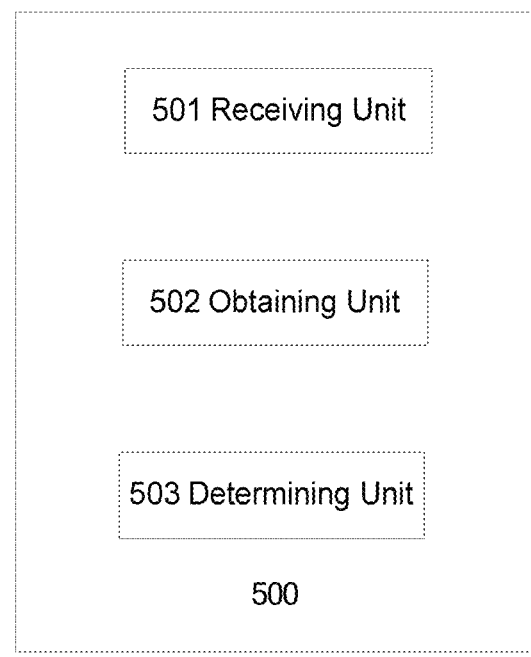
FIG. 9 illustrates a noise point identification device for use on a LiDAR in accordance with the third aspect of the present disclosure.

Further, the third aspect of the present disclosure involves a noise point identification device 500 for use in a LiDAR. As shown in FIG. 9, the device 500 comprises: a receiving unit 501 configured to receive a point cloud generated by the LiDAR; an obtaining unit 502 configured to obtain a distance between a point in the point cloud and the LiDAR, and at least one of reflectivity and continuity parameter of the point; and a determining unit 503 configured to determine whether the point is a noise point at least according to the distance and the at least one of the reflectivity and the continuity parameter.

Figure 10:
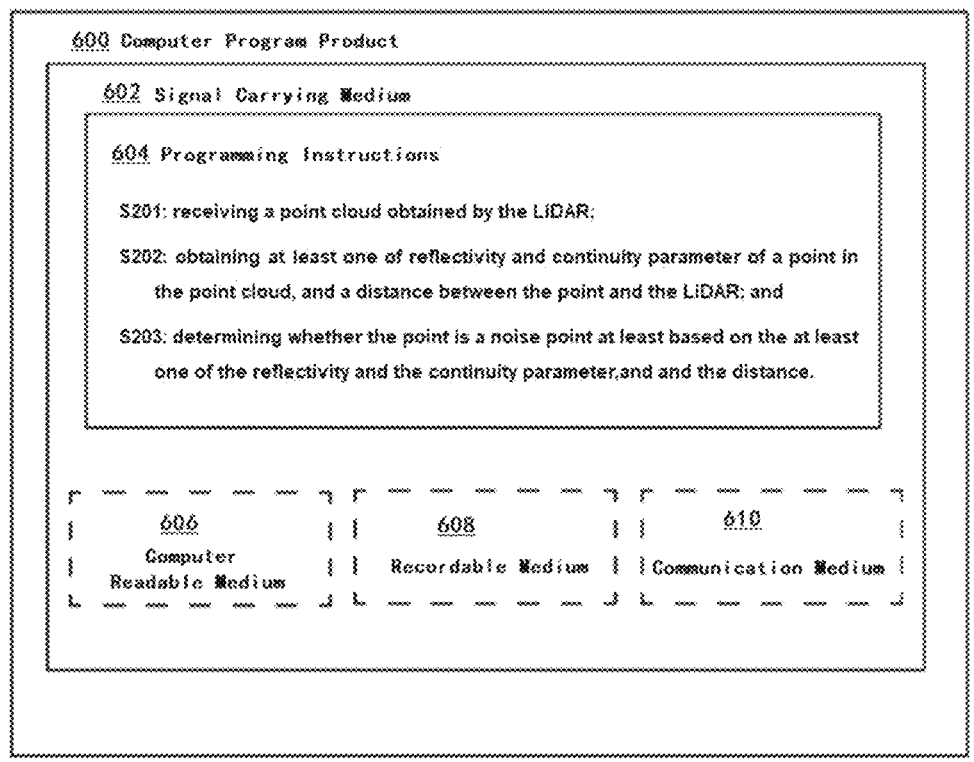
FIG. 10 illustrates a computer program product in accordance with the third aspect of the present disclosure.

The third aspect of the present disclosure also involves a block diagram of a computer program product 600, as shown in FIG. 10. A signal carrying medium 602 may be implemented as, or encompass, a computer readable medium 606, a computer recordable medium 608, a computer communication medium 610, or a combination thereof, which stores programming instructions 604 that may be configured with a processor to execute all or some of the processes described previously. These instructions may include, for example, one or more executable instructions for allowing one or more processors to execute the following processing: S201, receiving a point cloud generated by the LiDAR; S202, obtaining at least one of reflectivity and continuity parameter of a point in the point cloud, and a distance between the point and the LiDAR; and Step S203, determining whether the point is a noise point at least according to at least one of the reflectivity and the continuity parameter, and the distance.

The description of any process or method in a flow chart or otherwise set out herein may be understood to represent one or more modules, segments or portions of codes of executable instructions for steps of achieving a specific logical function or process, and the range of the preferable embodiments hereof covers other implementations, which may be achieved not following the orders shown or discussed herein, including executing a function in view of the function involved by basically simultaneous means or in reverse order. This should be understood by the skilled persons in the technical field of the examples of the present disclosure. The logics and/or steps shown in a flow chart or otherwise described herein, for example, the one that may be regarded as a sequencing list of executable instructions for achieving a logical function, may be particularly achieved in any computer readable medium for use by instruction execution systems, apparatuses or devices (such as a computer-based system, a system comprising processors or other systems that may read and execute instructions from an instruction execution system, apparatus or device), or combined use with these instruction execution systems, apparatuses or devices. In this description, "computer readable medium" may be any apparatus that may comprise, store, communicate, propagate or transmit programs for use by instruction execution systems, apparatuses or devices, or combined use with these instruction execution systems, apparatuses or devices. A more particular example, instead of an exhausted list, of the computer readable medium includes the following: an electric connection having one or more wiring (electronic device), a portable computer enclosure (magnetic device), a random access memory (RAM), a read only memory (ROM), an electrically programmable read-only-memory (EPROM or flash memory), an optical fiber device, and a CD read-only-memory (CDROM).

Moreover, the computer readable medium even may be paper or other suitable mediums, on which the programs may be printed. This is because the programs may be electronically acquired through, for example, optical scanning for paper or other mediums, and next through editing, decoding, or processing in other suitable ways if necessary, and then will be stored in a computer storage. It should be understood that every part of the present disclosure may be achieved by means of hardware, software, firmware or combination thereof.

In the embodiments described above, multiple steps or methods may be achieved using software or firmware stored in a storage and executed by suitable instruction execution systems. For example, if achieved with hardware, any of the following technologies commonly known in the art, or combination thereof, may be used to do so, just as same as done in another embodiment: a discrete logical circuit of logical gate for achieving logical functions for data signals, an application-specific integrated circuit with suitable combined logical gates, a programmable gate array (PGA), a field programmable gate array (FPGA), etc.

Furthermore, the solutions of the examples herein may be not only applied to mechanical LiDAR as mentioned in the examples above, but to other types of LiDARs, such as galvanometer scanning LiDAR, rotating mirror scanning LiDAR, or pure solid-state LiDAR including Flash LiDAR and phased array LiDAR. The present invention imposes no limitation on the type of applicable LiDARs. Last but not least, the contents described above are just preferable examples of the present disclosure, and are not used to limit the present disclosure. Although the detailed description of the present disclosure has been provided with reference to the foregoing examples, those skilled in the art still may make modifications to the technical solutions recorded in various examples described above, or conduct equivalent replacement of part of technical features therein. Any modification, equivalent replacement, improvement, if only within the spirit and principles set out herein, should be covered by the protection scope of the present disclosure.

What is claimed is:

1. A method for identification of a noise point used for a light detection and ranging (LiDAR) system, comprising:
   (a) receiving a point cloud generated by the LiDAR system;
   (b) obtaining a distance and a reflectivity corresponding to a point in the point cloud;
   (c) calculating a noise point confidence level of the point based at least in part on a combination of a distance factor and a reflectivity factor, wherein (i) the distance factor is set to zero when the distance is within a predetermined range of distance, otherwise the distance factor is set as a first weight, (ii) the reflectivity factor is to zero when the reflectivity is less than or equal to a predefined threshold for reflectivity, otherwise the reflectivity factor is set as a second weight, wherein the first weight is greater than the second weight; and
   (d) determining that the point is the noise point when the noise point confidence level is above a normal range of confidence level.

2. The method of claim 1, wherein the noise point confidence level is the sum of the distance factor and the reflectivity factor.

3. The method of claim 1, further comprising obtaining a continuity parameter of the point, wherein the noise point confidence level of the point is based on the distance factor, the reflectivity factor and a continuity factor of the continuity parameter.

4. The method of claim 3, wherein the continuity factor is set to zero when the continuity parameter is beyond a normal range of the continuity parameter, otherwise the continuity factor is set as a third weight.

5. The method of claim 4, further comprising obtaining a noise parameter of the point and the number of echo pulses corresponding to the point, wherein the noise point confidence level of the point is based on the distance factor, the reflectivity factor, the continuity factor, a noise factor of the noise parameter and an echo pulse number factor of the number of echo pulses.

6. The method of claim 5, wherein the noise factor is set to zero when the noise parameter is greater than a threshold for noise, otherwise the noise factor is set as a fourth weight, wherein the echo pulse number factor is set to zero when the number of echo pulses is greater than a threshold for pulse number, otherwise the echo pulse number factor is set as a fifth weight, and wherein the noise point confidence level is the sum of the distance factor, the reflectivity factor, the continuity factor, the noise factor and the echo pulse number factor.

7. The method of claim 6, wherein the first, second, third, fourth and fifth weights satisfy one or more of the following conditions:
the first weight equals to the sum of the second and third weights;
the second weight equals to the third weight;
the first weight equals to the threshold for confidence level;
the sum of the fourth and fifth weights equals to the second and/or third weights; and
the first weight is greater than the second, third, fourth and fifth weight.

8. The method of claim 6, further comprising dynamically adjusting the first weight, the second weight, the third weight, the fourth weight or the fifth weight based on a detected weather condition.

9. The method of claim 8, further comprising reducing the second weight and increasing the fourth weight when the weather condition indicates snowy, or increasing the fifth weight when the weather condition indicates foggy.

10. A system performing the method of claim 1 comprising:
a denoising unit coupled to the LiDAR system to receive the point cloud, and configured to perform the method to determine whether a given point in the point cloud is the noise point, and filter out noise points in the point cloud; and
an output unit coupled to the denoising unit and configured to output the point cloud.

11. The system of claim 10, further comprising a control unit coupled to the denoising unit, and capable of enabling or disabling the denoising unit, wherein in an enabled mode, the denoising unit filters out noise points in the point cloud, and the output unit outputs the point cloud with the noise points filtered out; and in a disabled mode, the denoising unit is disabled, and the output unit outputs the point cloud with the noise points not being filtered out.

12. The system of claim 11, wherein the control unit enables the denoising unit when a rainy, snowy or foggy weather condition is detected.

13. The system of claim 12, wherein the control unit is configured to detect a rainy, snowy or foggy weather by detecting the number of noise points in the point cloud greater than a predefined threshold.

14. The system of claim 11, wherein the control unit is configured to enable or disable the denoising unit based on an input from a user.

15. A light detection and ranging (LiDAR) system comprising:
a LiDAR device configured to scan its surroundings to generate a point cloud;
a computing unit coupled to the LiDAR device to receive the point cloud, and configured to calculate a noise point confidence level of a point in the point cloud based at least in part on a combination of a distance factor and a reflectivity factor, wherein (i) the distance factor is set to zero when the distance is within a predetermined range of distance, otherwise the distance factor is set as a first weight, (ii) the reflectivity factor is to zero when the reflectivity is less than or equal to a predefined threshold for reflectivity, otherwise the reflectivity factor is set as a second weight, wherein the first weight is greater than the second weight; and
an output unit coupled to the LiDAR device and the computing unit and configured to output the point cloud and noise point confidence levels of the points in the point cloud.

16. The LiDAR system of claim 15, wherein the computing unit is configured to calculate a noise point confidence level of a point in the point cloud, based on the distance factor of the point, the reflectivity factor of the point, a continuity factor of a continuity parameter of the point, a noise factor of the point and a pulse number factor of the point, wherein the continuity factor is set to zero when the continuity parameter is beyond a normal range of the continuity parameter, otherwise the continuity factor is set as a third weight, wherein the noise factor is set to zero when the noise parameter is greater than a threshold for noise, otherwise the noise factor is set as a fourth weight, wherein the echo pulse number factor is set to zero when the number of echo pulses is greater than a threshold for pulse number, otherwise the echo pulse number factor is set as a fifth weight,
and wherein the first weight is greater than the second, third, fourth and fifth weight.

17. The LiDAR system of claim 15, further comprising an input unit configured to receive a user input including an instruction to the output unit indicating whether to filter out noise points in the point cloud.

18. A device for identification of a noise point used for a light detection and ranging (LiDAR) system, the device comprising:
a receiving unit configured to receive a point cloud generated by the LiDAR system;
an obtaining unit configured to obtain a distance and a reflectivity of a point in the point cloud; and
a determination unit for determining whether the point is the noise point based at least in part on the distance and the reflectivity, wherein the determination unit is configured to:
(a) calculate a noise point confidence level of the point based at least in part on a distance factor and a reflectivity factor, wherein (i) the distance factor is set to zero when the distance is within a predetermined range of distance, otherwise the distance factor is set as a first weight, (ii) the reflectivity factor is to zero when the reflectivity is less than or equal to a predefined threshold for reflectivity, otherwise the reflectivity factor is set as a second weight, wherein the first weight is greater than the second weight, and (b) determine that the point is the noise point when the noise point confidence level is above a normal range of confidence level.

19. A non-transitory computer readable medium storing instructions that, when executed by a processor, causes the processor to perform the method of claim 1 for identification of the noise point.

* * * * *